(12) United States Patent
Pekay et al.

(10) Patent No.: US 7,374,114 B1
(45) Date of Patent: May 20, 2008

(54) DEVICE FOR THE DESTRUCTION OF DISC MEDIA

(75) Inventors: Joel Pekay, 3393 Whirlaway Dr., Northbrook, IL (US) 60062; Brian Gurin, 879 Belle Isle, Vernon Hills, IL (US) 60061; Robert Long, Lake in the Hills, IL (US); Jim Liles, Ingleside, IL (US)

(73) Assignees: Joel Pekay, Northbrook, IL (US); Brian Gurin, Vernon Hills, IL (US)

( * ) Notice: Subject to any disclaimer, the term of this patent is extended or adjusted under 35 U.S.C. 154(b) by 114 days.

(21) Appl. No.: 10/795,757

(22) Filed: Mar. 8, 2004

(51) Int. Cl.
*A47J 17/00* (2006.01)
*A47J 43/00* (2006.01)

(52) U.S. Cl. ............... 241/169; 241/270; 241/272

(58) Field of Classification Search .......... 241/168, 241/169, 169.2, 270, 272
See application file for complete search history.

(56) References Cited

U.S. PATENT DOCUMENTS

| | | | | |
|---|---|---|---|---|
| 2,506,970 A | * | 5/1950 | Milton | 99/581 |
| 2,572,378 A | * | 10/1951 | Milton | 99/581 |
| 3,587,692 A | * | 6/1971 | Nelson | 241/270 |
| 4,694,996 A | * | 9/1987 | Siegel | 241/100 |
| 4,967,970 A | * | 11/1990 | Michel | 241/169 |
| 5,632,450 A | * | 5/1997 | Moor | 241/100 |
| 6,722,240 B1 | * | 4/2004 | Weng | 83/167 |
| 6,910,650 B1 | * | 6/2005 | Siegelman | 241/168 |

* cited by examiner

*Primary Examiner*—Bena Miller
(74) *Attorney, Agent, or Firm*—Ladas & Parry LLP

(57) ABSTRACT

A device for the destruction of disc media is provided. The device includes an engagement member disposed within a housing portion, and a support member on which the disc media rests against. An actuating force is applied to move the engagement member and support member together, thereby pressing the disc media between the engagement member and support member, and causing the disc media to break into pieces. The data stored on the resultant broken pieces of disc media are now not easily readable, and may be discarded.

13 Claims, 5 Drawing Sheets

DEVICE FOR THE DESTRUCTION OF DISC MEDIA

FIELD OF THE INVENTION

The present invention relates generally to a device for the destruction of disc media. More specifically, the present invention relates to a device for breaking into small pieces disc media, so that the data stored thereon is no longer easily readable.

BACKGROUND OF THE INVENTION

Disc media is used to store data, and includes, but is not limited, to compact discs (CDs), DVDs, Pocket CDs, CD-Rs, CD-RWs, DVD-Rs, DVD-RWs, etc. The data which is stored on the disc media may be permanent, or not easily erased or written over. With the development of recordable disc media, business and personal record information are now being kept on disc media. This information is often times confidential. When data changes or is updated, a new disc may be used to record the information. The prior disc media typically may be stored for interim archival purposes, and then discarded. Media may also be used to transfer data or information between users, computers, servers, etc., and will then need to be destroyed.

A problem occurs when this information is to be disposed of, concerning how to destroy the stored data. Data stored on discs which are simply discarded in the trash could be easily retrieved by unauthorized persons. Thus, a need exists for a device which effectively renders the data unreadable, destroys the media, or makes the media non-functional before the discs are disposed of.

SUMMARY OF THE INVENTION

The present invention is a device for breaking disc media into pieces, effectively rendering the data stored thereon unreadable by conventional means. The broken disc media may then be disposed of.

BRIEF DESCRIPTION OF THE DRAWINGS FIGURES

DETAILED DESCRIPTION OF THE PREFERRED EMBODIMENTS

Figure 1:
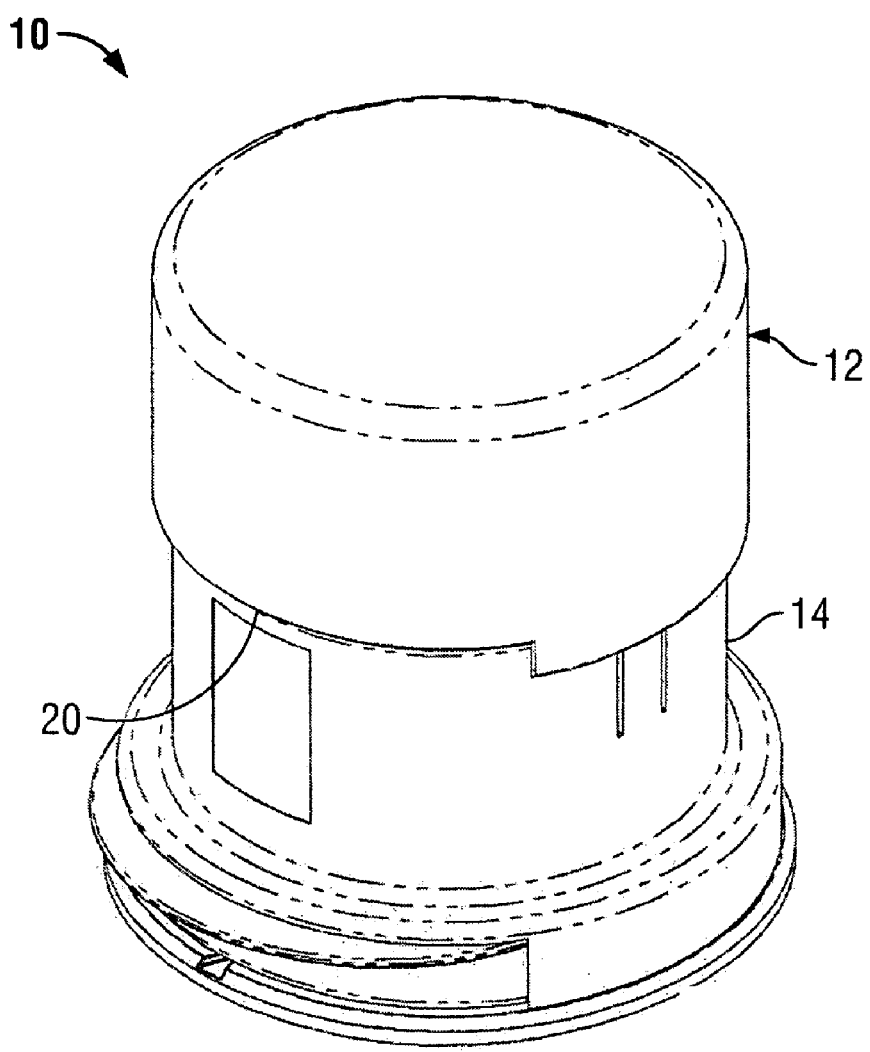
FIG. 1 is a perspective view of a preferred embodiment of the device for the destruction of disc media.

In some embodiments, device 10 for the destruction of disc media includes cylindrical housing cap 12 telescopically fitted to cylindrical base sleeve 14 which has base 25 which rests upon a support surface. Cap 12 houses engagement members 16 are fixed to the interior of cap 12, and spring 18 is disposed within cap 12 and supported on top of base sleeve 14. Slot 20 is provided in cap 12. Disc media may be inserted into the device when the cap and sleeve are fully extended, i.e., when the cap is at the top of its travel on the sleeve. The inserted disc is supported upon support blade 22 fixed within sleeve 14.

To destroy the disc media, a downward actuating force is applied to cap 12, thus stressing the engagement members 16 against the disc held in place by support blade 22. With sufficient actuating force, engagement members 16 will crack and break the disc into several fractured pieces 23, as the engagement members 16 are pushed into a fully depressed second position. The thus fractured disc pieces fall to the bottom of the base portion 14, where the pieces are collected in a receptacle 24. The pieces may then be discarded by removing the receptacle 24 and disposing of the pieces.

Cap 12 returns to the first position ready to receive another disc when the downward actuating force is removed, and the cap 12 is moved upward by an return force of the spring 18.

Engagement members 16 and support blade 22 may be made in a number of configurations and shapes. However, it is preferred that engagement members 16 and support blade 22 are shaped and configured such that each may pass the other without interference when the device is operated from the first position to the fully depressed second position. Opposing forces on the disc from the spaced apart and interfitting engagement members 16 and support blade 22 provide alternating compression and tension forces at the surface of the disc which completely and multiply fracture the disc with a minimal amount of actuating force being required.

Figure 2:
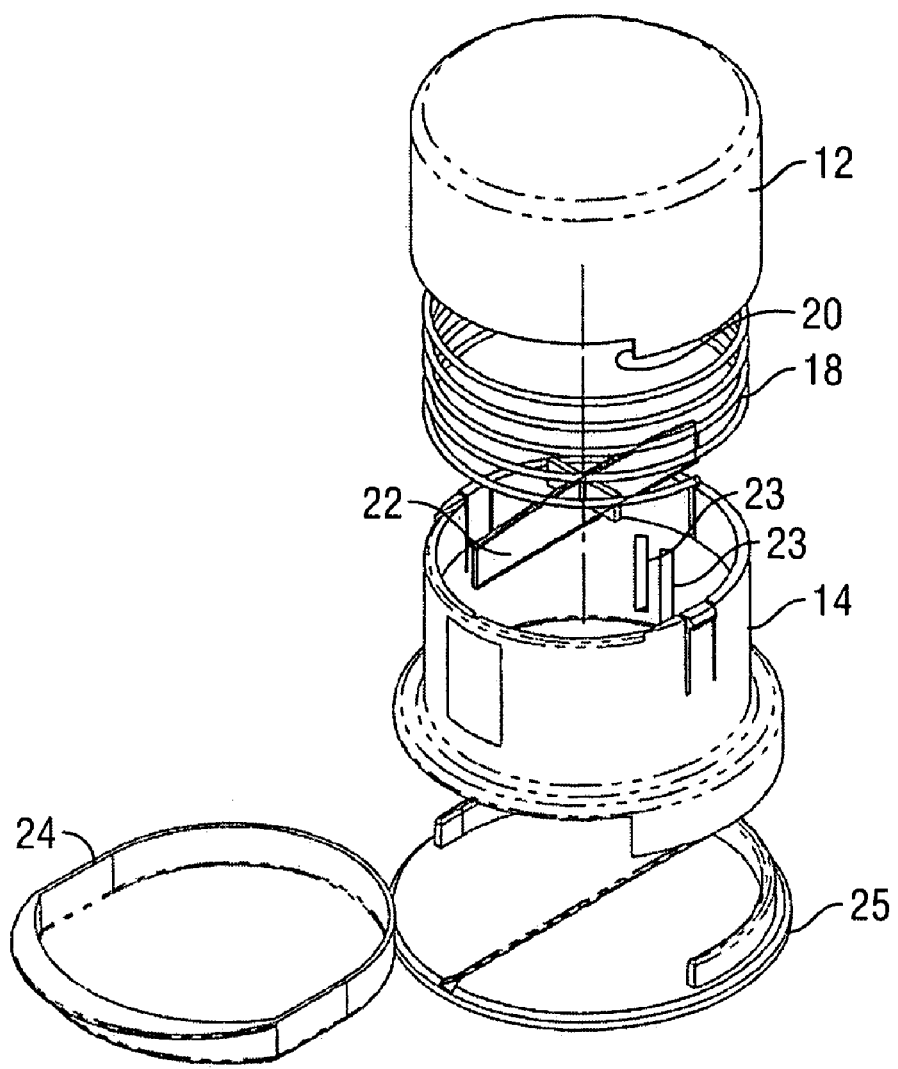
FIG. 2 is an exploded view of the device shown in FIG. 1.
Figure 3:
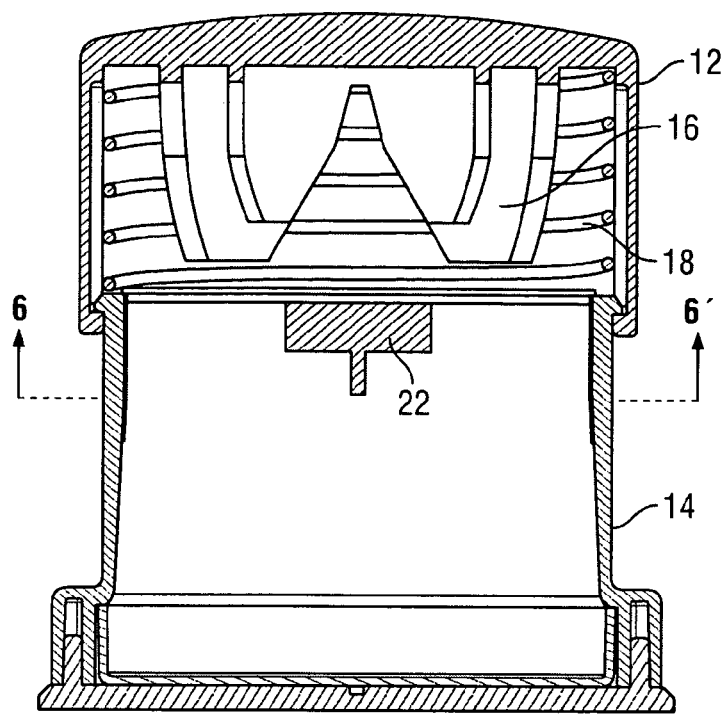
FIGS. 3, 4 and 5 are cross-sectional views through the side of the device shown in FIG. 1, in various positions of operation.
Figure 4:
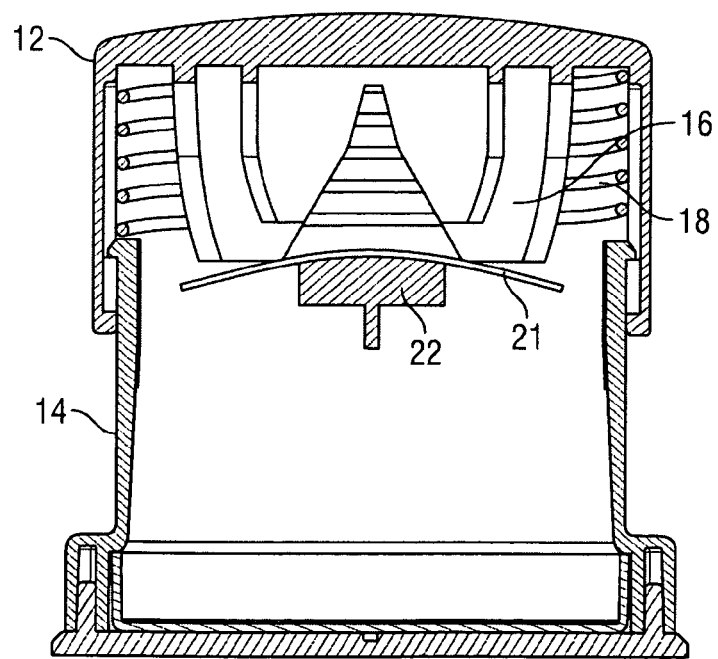
Figure 5:
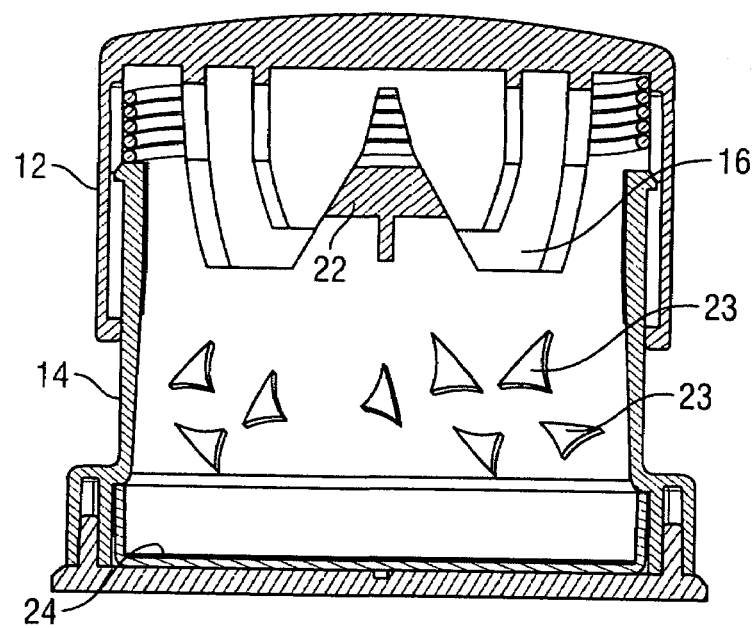

In the embodiment shown in FIGS. 1 through 6, the downward force is manually applied by a user pressing down on the top of the cap. FIGS. 3, 4, and 5 show a cross-sectional view of device 10 in various positions of operation. FIG. 3 shows the inside of device 10 in the first, loading position prior to any disc being inserted therein. FIG. 4 shows the cap in a slightly depressed position. As can be seen in this figure, disc 21 has been placed within the cap portion 12, and disc 21 is being stressed between engagement members 16 and support blade 22, but has not yet been fractured and broken into pieces. FIG. 5 shows the device 10 in the fully depressed position. At this stage of operation the disc 21 has been fractured into pieces 23 between engagement members 16 and support blade 22, and the pieces of disc 21 fall down into the receptacle 24, from which the pieces will later be retrieved for disposal.

Figure 7:
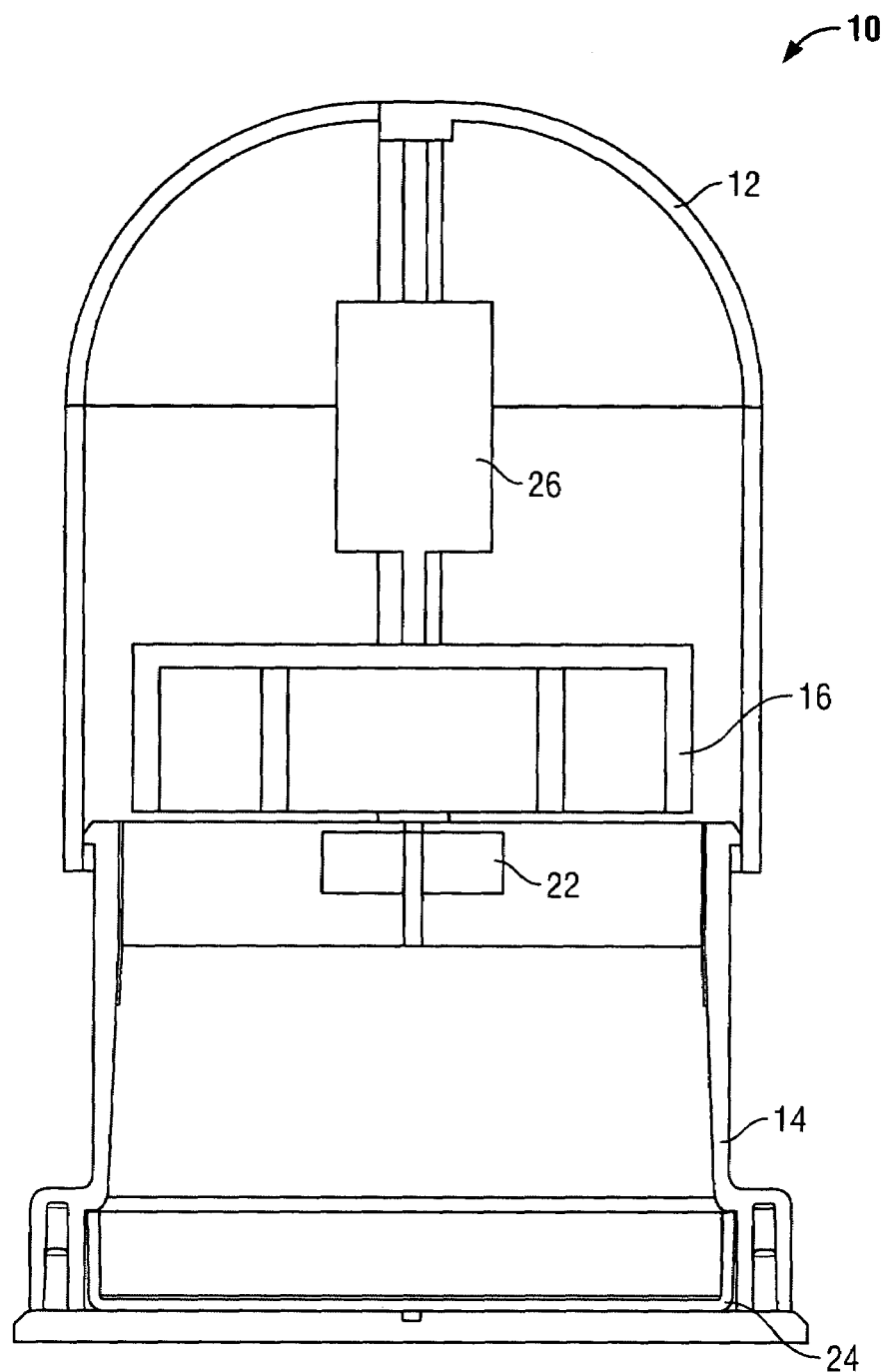
FIG. 7 is a cross-sectional view through the side of another preferred embodiment of the device.

FIG. 7 shows another embodiment in which a means for providing an actuating force 26, such as an electric motor, electric solenoid, hydraulic ram, or equivalent, may be used to pull engagement members 16 down into sleeve 14. In such an embodiment the engagement members 16 may either be fixed or free from the cap portion 12.

As shown in FIG. 7, engagement members 16 are fixed to the cap 12, and the cap portion 12 slidingly engages the base sleeve 14. The means for providing an actuating force 26 pulls the cap portion 12 and engagement members 16 downward in relation to the base portion 14.

Figure 6:
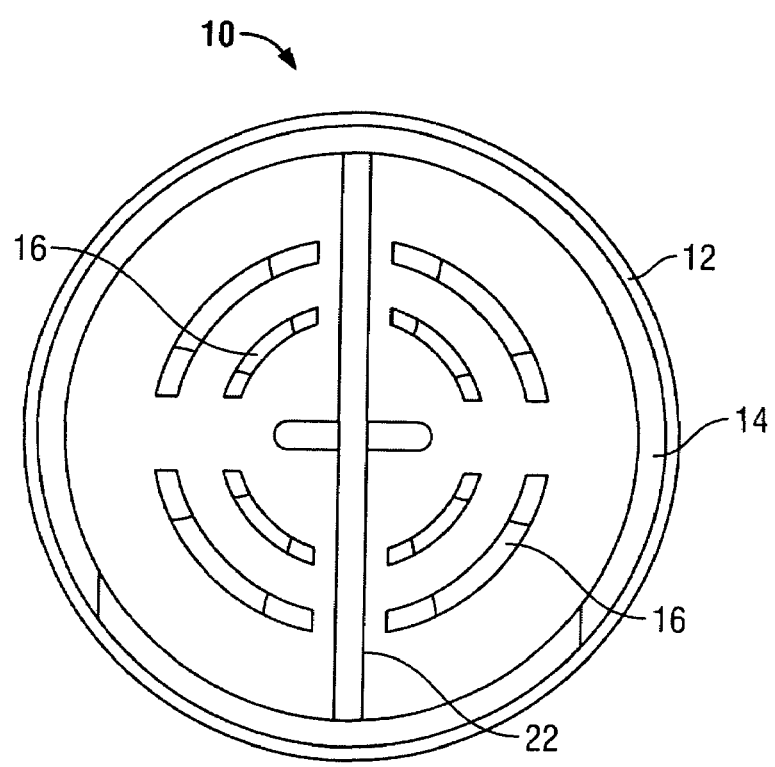
FIG. 6 is an upward cross-sectional view of the device shown in FIG. 1, taken along line 6-6' of FIG. 3.

FIG. 6 shows a cross-sectional bottom view of the base portion 14 and cap portion 12. This view clearly illustrates the concentric arrangement of the individual elements of engagement members 16, and the interfitting arrangement between the engagement members and support blade 22. The outer ring of engagement members 16 extends lower than the inner concentric ring of engagement members 16. The outer ring is sized to accommodate full sized CDs, whereas the inner ring is sized to accommodate mini-CDs.

Also, as shown in FIG. 2, slotted openings 23 may be added through base sleeve 14. The slots allow air which is within the device to vent out through the openings when the cap 12 is pressed down, thereby relieving interior pressure.

Although each of the preferred embodiments is shown in a vertically aligned arrangement, it is noted that the device may be orientated in any direction.

As will be apparent to those skilled in the art to which the invention is addressed, the present invention may be embodied in forms other than those preferred embodiments specifically disclosed above, without departing from the spirit or essential characteristics of the invention. The particular embodiments of the invention described above are therefore to be considered in all respects as illustrative and not restrictive. The scope of the present invention is as set forth in the appended claims.

We claim:

1. A device for the destruction of disc media, comprising:
    a cap;
    an engagement member attached to the cap;
    a base;
    a sleeve attached to the base, wherein the sleeve and the cap are configured to be slidably attached to each other;
    a spring engaged between the cap and the sleeve;
    a support blade attached to the sleeve;
    a receptacle slidably attached to the base;
    said engagement member being reciprocally movable between a first position and a second position;
    wherein the sleeve, the cap, the spring, the engagement member, and the support blade are configured to form a slot capable of receiving the disk media in said first position;
    wherein when an actuating force is applied to the cap, said engagement member moves to said second position;
    wherein said disc media is broken into pieces between said support blade and said engagement member as said engagement member is moved from said first position to said second position; and
    wherein said cap is shaped and configured to enclose said disc media within said device when said engagement member is moved from said first position to said second position.

2. The device according to claim 1 wherein when said actuating force is applied to said cap, said cap slidingly engages said sleeve.

3. The device according to claim 2 wherein said engagement member is fixidly disposed within said cap.

4. The device according to claim 1 wherein said receptacle is disposed within said base portion and is configured to receive broken pieces of the disk media.

5. The device according to claim 4 wherein said receptacle is a tray slidingly disposed within said base.

6. The device according to claim 1 further comprising a means for providing said actuating force.

7. The device according to claim 6, wherein said means for providing said actuating force is an electro-magnetic solenoid.

8. The device according to claim 6 wherein said means for providing said actuating force is an electric motor.

9. The device according to claim 6 wherein said means for providing said actuating force is a hydraulic ram.

10. The device according to claim 1 wherein the spring is configured to provide a return force to return the engagement member to said first position.

11. The device according to claim 1 wherein said engagement member and said support blade are shaped and configured to be spaced apart in said first position and interfitted together in said second position.

12. The device according to claim 1 further comprising an opening in said sleeve to vent air trapped within the sleeve.

13. A device for the destruction of disc media, comprising:
    a cap;
    an engagement member fixedly disposed within said cap;
    a base;
    a sleeve attached to the base, wherein the sleeve and the cap are configured to be slidably attached to each other;
    a spring engaged between the cap and the sleeve;
    a support blade attached to the sleeve;
    a receptacle slidably attached to the base;
    said engagement member being reciprocally movable between a first position and a second position;
    wherein the sleeve, the cap, the spring, the engagement member, and the support blade are configured to form a slot capable of receiving the disk media in said first position;
    wherein when an actuating force is applied to the cap, said engagement member moves to said second position, and said cap slidingly engages said sleeve;
    wherein said disc media is broken into pieces between said support blade and said engagement member as said engagement member is moved from said first position to said second position; and
wherein said cap is shaped and configured to enclose said disc media within said device when said engagement member is moved from said first position to said second position.

* * * * *